INVENTOR

ROBERT V. KOLARIK

BY:

Oldham & Oldham
ATTORNEYS

United States Patent Office 3,671,374
Patented June 20, 1972

3,671,374
COMPOSITE ARMOR
Robert V. Kolarik, North Canton, Ohio, assignor to Goodyear Aerospace Corporation, Akron, Ohio
Filed May 20, 1970, Ser. No. 39,951
Int. Cl. B32b 17/04, 17/10, 17/12
U.S. Cl. 161—93
2 Claims

ABSTRACT OF THE DISCLOSURE

Composite armor made from a glass-ceramic surface layer, and a resilient plastic-fiber glass substrata secured to the surface layer. The surface layer is about two-thirds of the weight of the armor and the plastic-fiber glass substrata preferably is about half as thick as the surface layer.

---

This invention relates to a composite armored plate laminate, and, more particularly, to a lightweight laminate structure which is highly resistant to bullets with soft metal (such as lead) cores and soft steel fragments.

Heretofore it has been known that there are many and varied ways to make armored plate or laminates. However, this armored plate has usually been metal, which has been heavy and expensive. There have been attempts to create transparent, bullet resisting armored laminates or plates, but these plates have also had to be extremely thick and heavy as well as expensive. Such armored plate has not been very useful on military personnel where lightness of weight is an essential criteria.

It is the general object of the invention to avoid and overcome the foregoing and other difficulties of and objections to prior art practices by the provisions of a hard faced plastic armored plate or laminate structure which is highly resistant to lead cored bullets, relatively light in weight and easy to handle, and which is also relatively low in cost.

Another object of the invention is the provision of an armored plate made of a face sheet of ceramic-glass or dense glass wherein the face sheet is adapted to shatter, dissipate the initial bullet impact, and to then carry the load of impact into a resilient plastic backing, thereby distributing the force of the bullet over a large diameter of the final load carrying plastic layer.

Another object of the invention is to provide a lightweight, effective lead cored bullet and soft steel fragment resistant plastic laminate where the plastic substrate reenforcing layer is about half as thick as the ceramic-glass or equivalent face sheet which is about 10 to 30% more dense than the reenforcing layer.

Another object of the invention is to provide a laminate of the type set forth in which the substrata yields and delaminates to absorb force during bullet penetration.

The aforesaid objects of the invention, and other objects which will become apparent as the description proceeds, are achieved by providing a laminate structure resistant to a lead cored projectile and soft steel fragments and including, as one embodiment of the invention, the combination of a facing layer made from a hard, dense, crystalline glassy material, a reenforced plastic substrata layer, and flexible bonding means between the facing layer and the substrata layer, the facing layer having the tendency to shatter in a expanding conical shape inwardly from the impact point of the bullet, and the substrata having high resilience and high impact resistance.

For a better understanding of the invention, reference should be had to the accompanying drawings, wherein.

Figure 1:
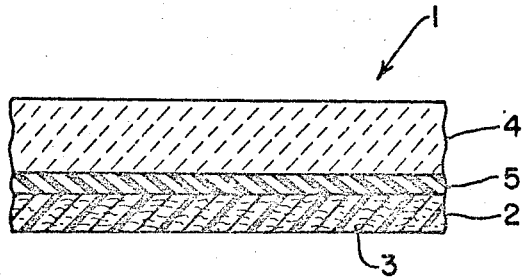
FIG. 1 is a fragmentary cross sectional view of a laminate composite armor comprising one embodiment of the invention.

With specific reference to the details of the invention illustrated in the drawings, the numeral 1 indicates generally a laminate armor plate comprising a plastic substrata layer 2 reenforced with a layer or layers of glass fabric 3, an extermely hard, dense surface layer 4, and with the layers 2 and 4 being bonded together by a layer of a flexible bonding agent 5.

The first prinicple of the invention is that the outer layer 4 must be of an extremely hard, dense material in order to blunt the oncoming projectiles. Preferably, glass or a ceramic-glass having a very high compressive strength is used to form the layer 4. The layer 4 is about .4 to .5 inch thick. It has been found that a thickness of the layer 2 between .20 inch to .30 of an inch, and in the combination above described, provided adequate protection for 30. Ball M2 ammunition at 0-yard shooting rand and 0 degree obliquity. Armor protection of this type is desired for aircraft and helicopter protection against ground troop fire and for general personnel use.

At least certain other very hard lightweight but dense materials can be used to meet the objects of the invention to form the face sheet 4. These would include silicon carbide and boron carbide, also of high density and purity. For example, Corning Glass Works Pyroceram #9606, a glass-ceramic product, has worked very well to meet the objects of the invention.

Figure 2:
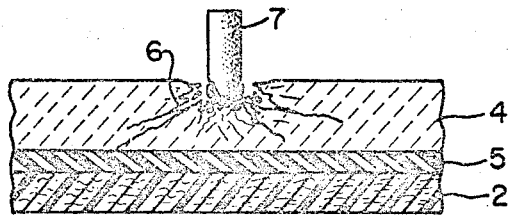
FIG. 2 is a fragmentary cross sectional view of the laminate structure of FIG. 1 showing a projectile just after striking the outer layer of the laminate and the fragmentation that results therefrom.

It is to be particularly noted, with respect to FIG. 2, that the glass-ceramic layer 4 tends to fracture in an expanding conical shape, indicated generally by the numeral 6. from the point of impact created by the projectile 7. The angle of conical fracture is believed to correspond to the shock wave sent ahead of the projectile. The conical expansion 6 of the impact area greatly distributes the rather small and compact impact force of the projectile 7 over a much larger area onto the substrata layer 2.

The second principle of the armored laminate plate construction is based on the resilience and high impact resistance of the reinforced plastic substrata layer 2, and its force absorbing action by delaminating upon bullet impact. The layer 2 is made up of a plurality of layers of glass fabric, each layer formed of straight warp cords or filaments and undulting weft cords each of about the same strength. The layers may be laid in any random relation to each other, and in fact more than one layer can be in the same direction. The layers are saturated with a low content of resin and built up to a required thickness, for example, about one-quarter inch. By leaving the original oils, resins, or dirt on the glass fabric caused by weaving and by using a low content of binding resin, such as 25% of resin to 75% by weight of glass fabric a structure is provided in which the layers separate from each other, or delaminate, with a force absorbing action upon being struck with a projectile. Typical binder resins are known polyester and phenolic resins.

The substrata layer 2 should be about 33% of the weight of the armor plate and should be in the range of between about .25 to .75 times the thickness of the face layer 4.

Such face layer 4 may be made from other glassy materials, as desired, such as borosilicate glass (Corning 7740), fused silica, 96% silica (Vycor), or soda lime glass. The face layer is translucent and/or opaque and hard, crystalline glassy materials are preferred.

The adhesive layer 5 usually is from about .005 to .015 inch thick and is, in effect, of negligible weight.

Figure 3:
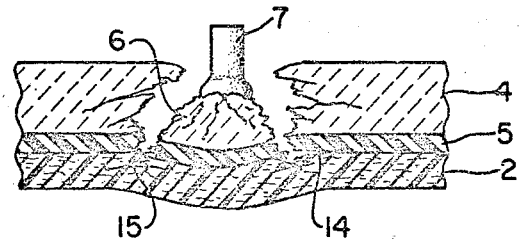
FIG. 3 is a view, similar to FIG. 2, but illustrating the further penetration of the projectile.

The delaminating effect of the several layers upon projectile impact is shown in FIG. 3. The projectile 7, somewhat more deformed, has penetrated farther into the laminate. The conical plug 6 has moved against the substrata 2 to deflect it downwardly over a relatively large area. This causes delamination of the reenforcing layers in a region 14, and breakage at an area or region 15 of some of the reenforcing layers of glass fabric. The result is a high force absorbing and smothering action upon the projectile providing the protection desired.

The flexible bonding agent 5 is preferably a known elastomeric material which is polymerizable at room temperature and containing 100% solids when in liquid form, for example, a polysulfide, polyurethane, or silicone rubber adhesive.

The facing layer may be continuous or gridded.

The composite armor has tested quite well and is resistant to pentration by 30 cal. lead cored projectiles and to fragment simulator projectiles. The armor is light in weight and adapted for personnel wear. Hence, the objects of the invention have been achieved.

What is claimed is:

1. Armored plate, comprising:
   a resin-glass fabric substrata having a plurality of layers of resin impregnated glass fabric therein and adapted to delaminate with a force absorbing action in stopping a projectile;
   a facing layer on the substrata consisting of a very hard dense glassy material selected from the group consisting of borosilicate glass, fused silica, 96% silica, and glass-ceramic, the material having the characteristics of shattering and deforming a projectile striking it and of forming a conical plug of increasing diameter in the direction of projectile penetration to distribute the force of the projectile over a greater area of the substrata, the facing layer weighing about twice the weight of the substrata; and
   a layer of flexible-adhesive securing the facing layer to the substrata.

2. Armored plate according to claim 1 when the facing layer is a single, unitary layer.

References Cited
UNITED STATES PATENTS

| | | | |
|---|---|---|---|
| 3,516,898 | 6/1970 | Cook | 161—93 |
| 2,697,054 | 12/1954 | Dietz et al. | 161—404 UX |
| 2,861,021 | 11/1958 | Dietz et al. | 161—404 UX |
| 2,991,209 | 7/1961 | Worrall | 161—404 X |
| 3,135,645 | 6/1964 | Burkley | 161—404 X |
| 3,179,553 | 4/1965 | Franklin | 161—404 X |
| 3,431,818 | 3/1969 | King | 161—404 UX |
| 3,444,033 | 5/1969 | King | 161—404 X |
| 3,324,768 | 6/1967 | Eichelberger | 161—404 UX |
| 3,573,150 | 3/1971 | Broutman et al. | 161—55 |

WILLIAM A. POWELL, Primary Examiner

U.S. Cl. X.R.

156—344; 161—165, 404